United States Patent
Dirstine et al.

(10) Patent No.: US 7,650,444 B2
(45) Date of Patent: *Jan. 19, 2010

(54) SYSTEMS AND METHODS FOR REMOTELY MANAGING AN APPLICATION-SPECIFIC DISPLAY DEVICE

(75) Inventors: Adam D. Dirstine, Rochester, MN (US); David J. Hutchison, Rochester, MN (US); Pamela A. Wright, Rochester, MN (US); Jeffrey M. Ryan, Byron, MN (US)

(73) Assignee: Digi International, Inc., Minnetonka, MN (US)

( * ) Notice: Subject to any disclaimer, the term of this patent is extended or adjusted under 35 U.S.C. 154(b) by 197 days.

This patent is subject to a terminal disclaimer.

(21) Appl. No.: 11/536,452

(22) Filed: Sep. 28, 2006

(65) Prior Publication Data

US 2008/0098411 A1  Apr. 24, 2008

(51) Int. Cl.
G06F 3/00 (2006.01)
G06F 13/12 (2006.01)
G06F 15/16 (2006.01)
(52) U.S. Cl. .............................. 710/72; 710/15; 710/62; 710/73; 709/217; 709/218; 709/219
(58) Field of Classification Search .................. 710/15, 710/62, 72, 73; 709/217, 218, 219
See application file for complete search history.

(56) References Cited

U.S. PATENT DOCUMENTS

| 6,047,319 A | 4/2000 | Olson |
| 2006/0026017 A1* | 2/2006 | Walker ........................... 705/1 |
| 2006/0059336 A1* | 3/2006 | Miller et al. ................. 713/165 |
| 2007/0005867 A1* | 1/2007 | Diamant ..................... 710/306 |

OTHER PUBLICATIONS

"Panasonic ideas for life", Panasonic Broadcast & Television Systems Company, Seacaucus, NJ (published before Sep. 28, 2006); 6 pages.
"Product Data Sheet: ConnectPort", Inside Out Networks, Austin, TX (Jul. 2005); 2 pages.
"Product Data Sheet: ConnectPort Display", Digi International, Minnetonka, MN (Mar. 2006); 2 pages.

* cited by examiner

*Primary Examiner*—Niketa I Patel
(74) *Attorney, Agent, or Firm*—Schwegman, Lundberg & Woessner, P.A.

(57) ABSTRACT

A communications device comprising an embedded application-specific device driver for an application-specific display and an embedded remote access application that execute on a processor. The embedded application-specific device driver is configured to communicate data with a communication (COM) port via a serial port and to provide a video signal to the application-specific display. The embedded remote access application is configured to remotely access the application-specific display and to communicate display data via a network.

22 Claims, 6 Drawing Sheets

SYSTEMS AND METHODS FOR REMOTELY MANAGING AN APPLICATION-SPECIFIC DISPLAY DEVICE

TECHNICAL FIELD

This document relates generally to devices and systems that communicate via a network and in particular to communication among applications over a network.

BACKGROUND

An application-specific display device is a device that serves a specific purpose and includes a display screen or monitor as the primary user interface. An example of an application-specific display device is a fast food restaurant kitchen display terminal. In a fast food restaurant, food orders taken at the point of sale register are typically displayed on text terminals residing in the kitchen. This is in contrast to general purpose personal computers that run general operating systems, such as a Windows® or Linux operating system for example.

FIG. 1 shows a block diagram of a host computer 105 and an application-specific display device 110 with an attached display screen 102. In the example shown, a host application 115 communicates with an application-specific display device application 120 over a serial communication link 125. Both the host computer 105 and the end device communicate over the serial communication link 125 using serial ports 128, 132 and serial port drivers 130, 135 to control communications over serial ports 128 and 132. An application running on a host system sends commands to the terminal to display the order on the terminal screen. Existing application-specific display devices do not provide a way to monitor performance of the display device other than having a service person in the physical presence of the device.

SUMMARY

This document describes devices, systems, and methods that allow applications to communicate over a network. One device example includes an embedded application-specific device driver for an application-specific display and an embedded remote access application that execute on a processor. The embedded application-specific device driver is configured to communicate data with a communication (COM) port via a serial port and to provide a video signal to the application-specific display. The embedded remote access application is configured to remotely access the application-specific display and to communicate display data via a network.

One method example includes embedding an application-specific device driver for an application-specific display in a communications device where the application-specific device driver communicates via a serial port, and embedding a remote access application in the communications device to provide access to the application-specific display over a network.

This summary is intended to provide an overview of the subject matter of the present patent application. It is not intended to provide an exclusive or exhaustive explanation of the invention. The detailed description is included to provide further information about the subject matter of the present patent application.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
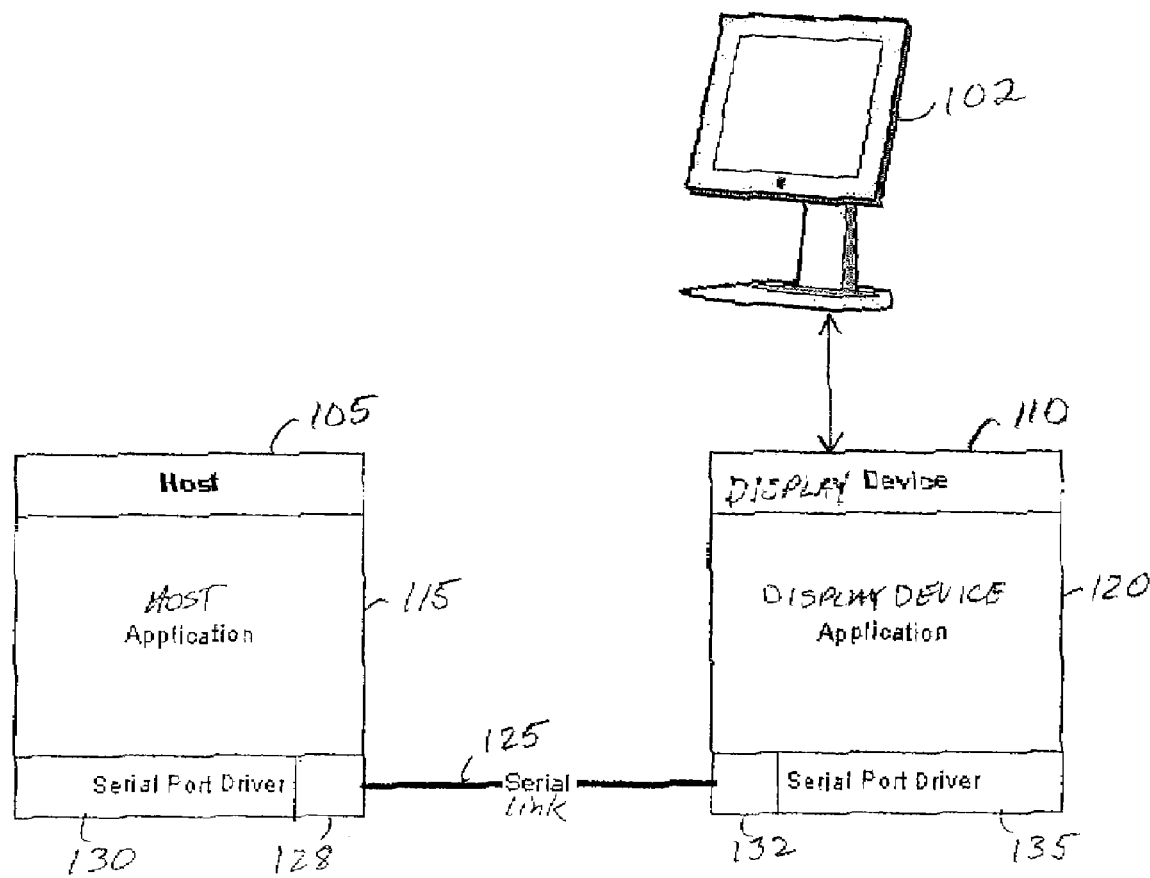
FIG. 1 shows a block diagram of a host computer and an application-specific display device with an attached display screen.
Figure 2:
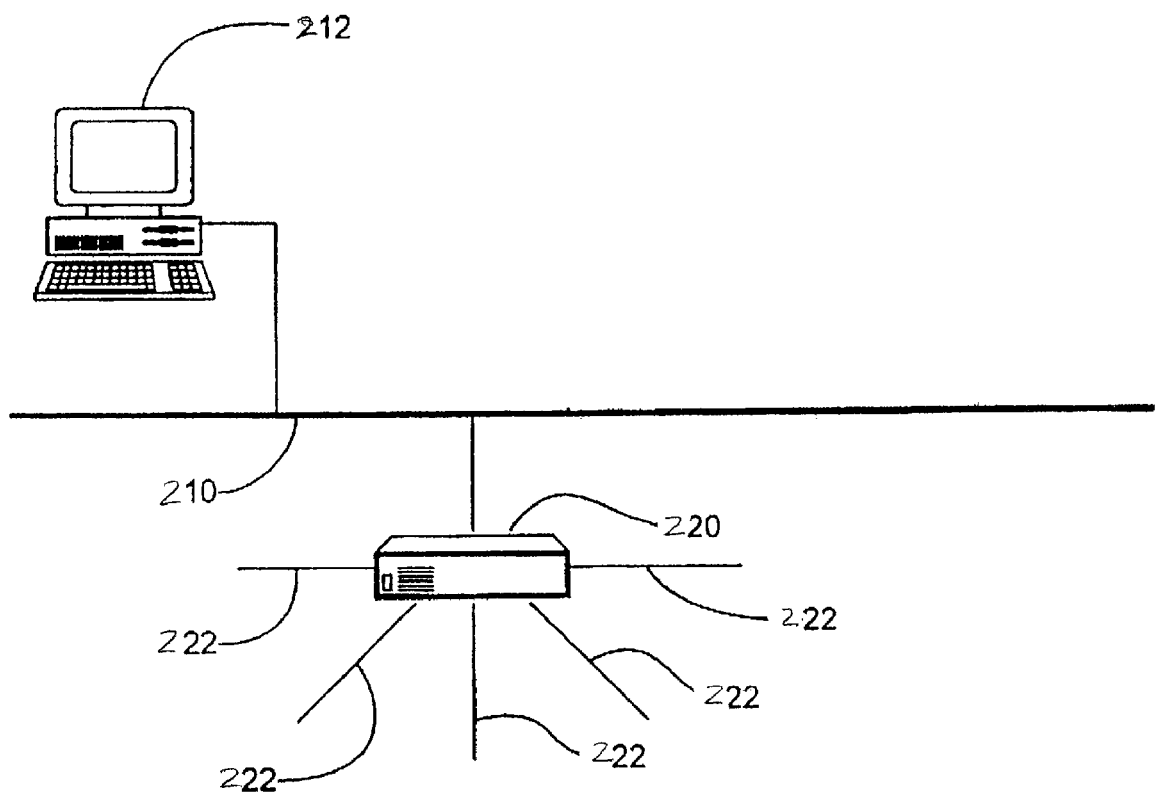
FIG. 2 illustrates an example of a host computer that communicates with devices using a device server.

Device servers allow a host computer to communicate with devices. An example is shown in FIG. 2. Typically, the devices are connected by serial communication lines 222 to one or more device servers 220 and an application running on a host computer 212 communicates with the serial devices over the network 210 using the device server 220. More than one host computer 212 can communicate over the network 210 with the same device connected to the device server 220.

Figure 3:
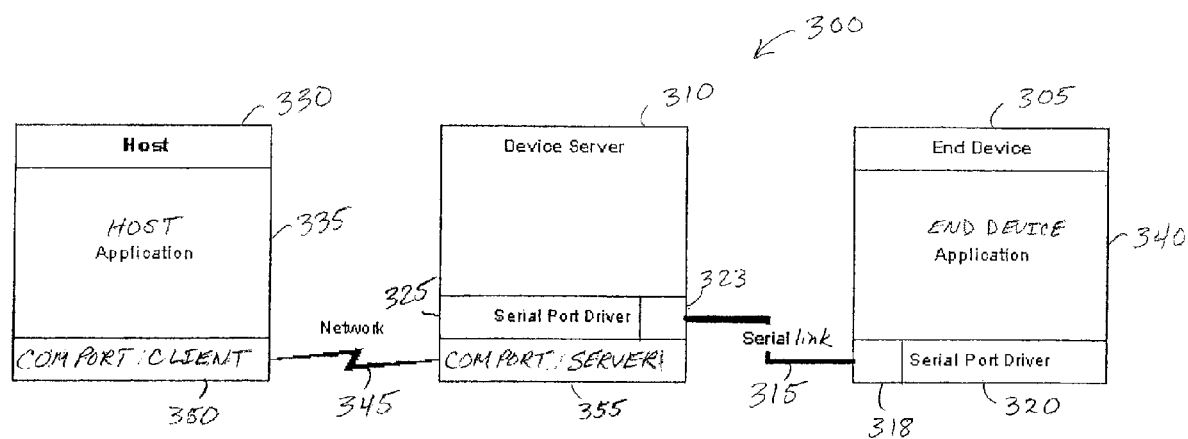
FIG. 3 shows a block diagram of portions of a client-server system that uses serial port redirection.

Devices that communicate serially can be network-enabled by connecting them to a device server and installing a serial driver on a host computer to provide serial port redirection. FIG. 3 shows a block diagram of portions of a client-server system 300 that uses serial port redirection. The system 300 includes an end device 305 coupled to a device server 310 via a serial communication link 315 through serial ports 318, 323. Examples of an end device include, without limitation, a printer or an application-specific display device. The device server 310 and the end device 305 include serial ports 318, 323 and serial port drivers 320, 325 to control the communications over serial ports 318, 323. The system 300 also includes a host computer 330. A host application 335 that executes on the host computer 330 communicates with an end device application 340 by communicating with the device server 310 over a network 345. To provide serial port redirection, a communication (COM) port client 350 is included in the host computer 330 and a COM port server 355 is included in the device server 310. Serial port data from the host application 335 is sent via the network 345 to the device server 310. From there it is routed directly to the serial port 323 which is connected to the end device 305. COM port redirection makes the serial port 318 of the end device 305 appear to the host application 335 to be local to the host computer 330.

Figure 4:
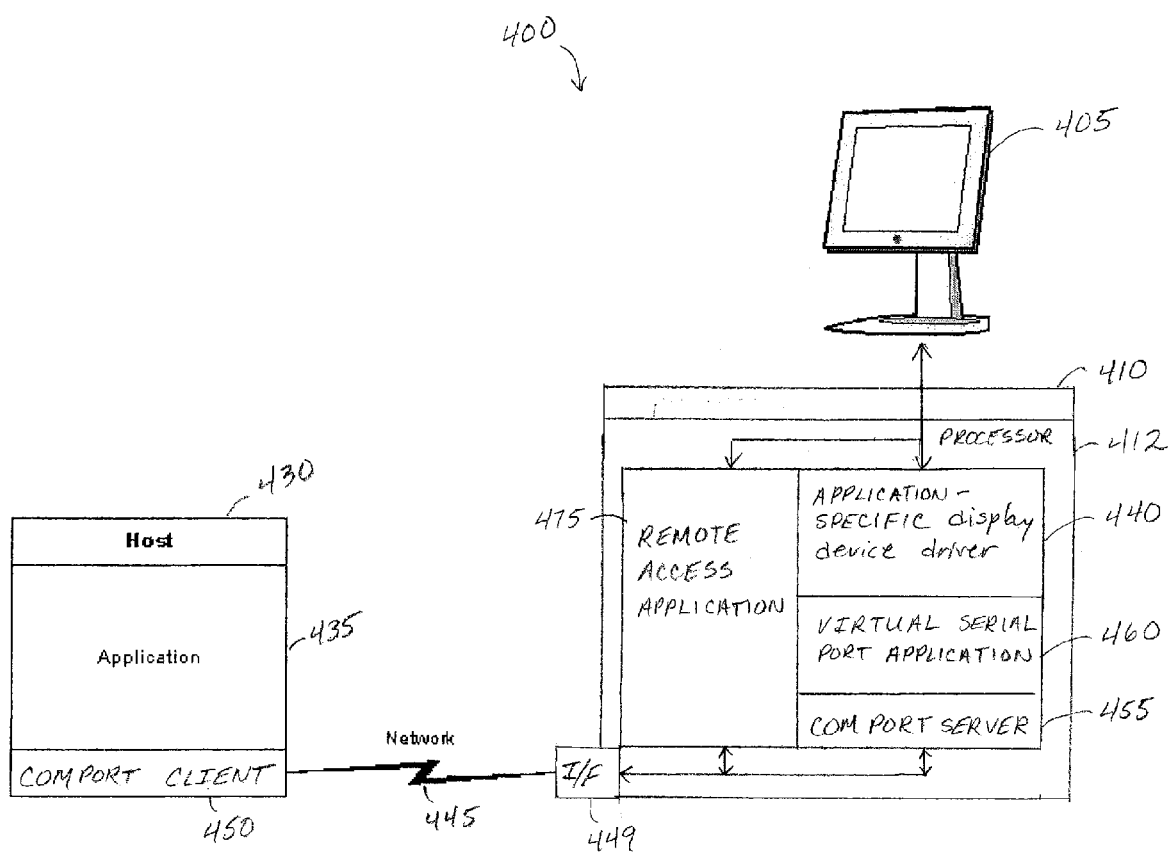
FIG. 4 shows a block diagram of portions of a system that allows an application-specific display to be monitored by a computer over a network.

FIG. 4 shows a block diagram of portions of a system 400 that allows an application-specific display to be monitored by a computer over a network. The system includes a host computer 430 and a communications device 410 linked by a network 445. It can be seen that the system 400 does not include the device server 310 and the end device 305 of FIG. 3. They have been replaced with the communications device 410. The embedded application 440 executes on the processor 412 and is an application-specific device driver for an application-specific display. Thus, the embedded application replaces the functionality of the end device 305 of FIG. 3.

The communications device 410 includes a video port, such as a VGA, SVGA, or LCD video port, to couple to a display 405. In one embodiment, the embedded application 440 is an ACSII terminal emulator. In another embodiment, the embedded application 440 is a vt220 terminal emulator. A video signal is sent from the communications device 410 to the display 405. Examples of an application-specific display include, without limitation, a kitchen display, a point of sale display, a public information display, and a digital advertising display.

The embedded application 440 communicates data with a COM port via a serial port and provides a video signal to the application-specific display 405. A host application program 435 and the embedded application 440 communicate over the network 445. COM port redirection is established in the system by a COM port client 450 in the host computer 430 and a COM port server 455 in the communications device 410. A COM port client 450 typically maps the network connection directly to a physical serial port on a device server and is tightly coupled to the serial port.

The communications device 410 includes an embedded remote access application 475. The remote access application 475 executes on the processor 412 and provides remote access by the host computer 430 to the application-specific display 405 by communicating display data via the network 445. The remote access application 475 and the COM port server 455 are communicatively coupled to the network 475 by the network interface 449. In some embodiments, the embedded remote access application 475 includes an embedded virtual network computing (VNC) server application to communicate over the network 445 to a VNC client that executes on the host computer 430. In some embodiments, the embedded remote access application 475 includes an embedded remote desktop protocol (RDP) server application to communicate over the network to an RDP client that executes on the host computer 430.

Because it is usually desirable to use the existing communication protocol for the application-specific display device and avoid having to create a new communication protocol for the system 400, the embedded application 440 communicates via a serial port. The serial port is provided by a virtual serial port application 460 included in the communications device 410. The virtual serial port application 460 translates data communicated between the COM port server 455 and the embedded application 440. This translation makes it appear that the COM port server 455 and the embedded application 440 were connected by a serial communication link.

In some embodiments, the virtual serial port application 460 includes a serial port driver and a memory buffer. The serial port driver is a pseudo device driver in communication with the embedded application 440 and implements the standard serial device interfaces (e.g., open, read, write, close, etc.). The embedded application 440 interacts with the serial port driver as if it was a standard serial port. However, instead of reading from or writing to a physical device, the serial port driver sends and receives data through a virtual endpoint and the memory buffer, then to the COM port server 455 and over the network 445. Thus, the embedded application 440 uses the same interface to communicate over a physical serial port or a virtual serial port. The COM port client 450 communicates data to the embedded application 440 over the network 445. Serial port data from the host application 435 is sent via the network 445 to the COM port server 455. From there it is routed directly to the memory buffer of the virtual serial port application 460 which includes the serial port driver in communication with the embedded application 440.

It should be noted that the system 400 is not a client-server system. In a client-server system, as much processing as possible is offloaded from a device server onto an end device. Here, the communications device 410 includes some characteristics of a client server and some characteristics of the application-specific display device.

The host computer 430 includes a COM port client 450 that, together with the COM port server 455 of the communications device, implements COM port redirection. With COM port redirection, it appears to a host application 435 that a serial device connected to the COM port server 455 is local to the host computer 430. Because the communications device 410 includes a virtual serial port application 460, it appears to the host application 435 that an end device is connected locally to the host computer. However, the end device is instead replaced with an embedded application 440.

The COM port client 450 includes a driver to communicate with the COM port server 455 via the network 445. In some embodiments, the driver includes an application programming interface (API) by which the host application program 435 is granted full control of a remote COM port connection including hardware and software flow control. In some embodiments, the network connection between the host computer 430 and the communications device 410 is a bytestream connection, and the network 445 uses a TCP/IP protocol running on top of an Ethernet protocol. In some embodiments, the host computer 430 includes a daemon to execute on the host computer 430. The daemon uses a STREAMS interface to establish a bidirectional bytestream connection between the driver and the communications device 410. An approach for providing communication port redirection is described in U.S. Pat. No. 6,047,319, entitled "Network Terminal Server with Full API Implementation," filed Jul. 17, 1996, which is incorporated herein by reference.

In some embodiments, the communications device 410 includes a plurality of embedded applications 440 that each emulates an end device. In one such embodiment, the host application program 435 communicates with the embedded applications 440 over the network 445 using a plurality of COM port servers 455 and virtual serial port applications 460. The driver of the COM port client 450 maps a plurality of COM ports servers of the communications device 410 to a plurality of virtual serial port applications 460. In another embodiment, the system 400 includes a plurality of communications devices 410 and the COM port client 450 maps a plurality of COM port servers of a plurality of communications devices 410 to a plurality of virtual serial port applications 460.

There does not have to be a one-to-one correspondence between the number of embedded applications 440 that run on the communications device 410 and the number of virtual serial port applications 460. In some embodiments, the communications device 410 includes at least one embedded application 440 that communicates over a plurality of serial ports. A plurality of virtual serial port applications 460 are provided to translate data communicated between a plurality of COM port servers 455 and the embedded application 440. The host application program 435 communicates with the embedded application 440 via a network 445 and the plurality of virtual serial port applications 460.

Figure 5:
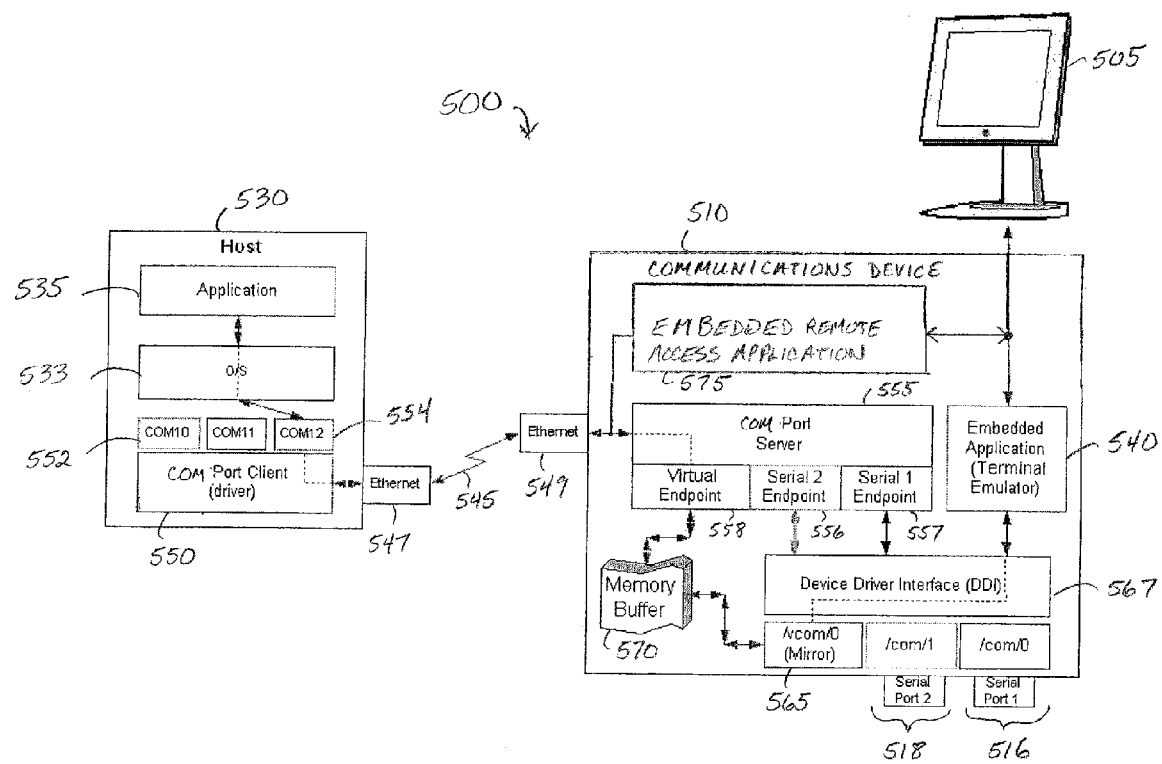
FIG. 5 shows a block diagram of portions of another embodiment of a system that allows an application-specific display to be monitored by a computer over a network.

FIG. 5 shows a block diagram of portions of another embodiment of a system 500 that allows an application-specific display to be monitored by a computer over a network. The system 500 includes a display 505 or monitor, a communications device 510, and a host computer 530. Examples of a display 505 include VGA, SVGA, or LCD display.

The communications device 510 replaces the VT220 terminal and any device server. The communications device 510 includes two physical serial ports (/com/0 and /com/1) 516, 518 and one virtual serial port (/vcom/0) 565 and device driver interface (DDI) 567. The communications device 510 also includes a COM port server 555 in communication with two serial endpoints 556, 557, and a virtual endpoint 558. A terminal emulator embedded application 540 reads commands from a serial port, processes the commands, and updates the attached display 505. In this case the terminal emulator embedded application 540 is reading from the virtual serial port 565.

The host computer 530 includes an operating system (OS) 533 and a host application 535. The host application 535 sends VT220 display commands to a terminal via a serial port. The host computer includes a COM port client 550 with three virtual COM ports configured for a remote device. The first two virtual COM ports (COM10 and COM11) 552, 553 represent the two physical serial ports 516, 518 on the communications device 510. The third virtual COM port (COM12) 554 represents the virtual serial port 565 on the communications device 510. The host application 535 is configured to send VT220 display commands to the virtual COM port 554. The flow of display commands from the host application 535 to the terminal emulator embedded application 540 on the communications device 510 is indicated by the arrows and dashed lines in FIG. 5.

The host application 535 sends VT220 commands to the virtual COM port 554 as serial data. The COM port client 550 sends the serial data to the COM port server 555 running on the communications device 510 over the network 545 and the Ethernet connections 547, 549. The COM port server 555 routes the serial data to the virtual endpoint 558. The virtual endpoint 558 puts the serial data in a shared memory buffer 570 and then signals to the virtual serial port driver 565 (a serial port mirror driver) that data is available.

The terminal emulator embedded application 540 continually performs reads on the virtual serial port 565. If data is available in the shared memory buffer 570, the virtual serial port driver 565 removes it from the shared memory buffer 570 and sends it to the terminal emulator embedded application 540. The terminal emulator embedded application 540 processes the commands in the data and displays the orders on the attached display 505. It then repeats the process by reading more commands. Similarly, data can flow the other way; from the terminal emulator embedded application 540 on the communications device 510 to the host application 535.

Because the serial port driver 565 is a pseudo driver, the communications device 510 is flexible in regards to communication protocols. The serial communication protocol used by the COM port server 555 can be different from the serial communication protocol used by the embedded application 540. In one embodiment, the serial port driver 565 and the memory buffer 570 provide a mapping of the protocol use by the embedded application 540 to the protocol of the COM port server 555. Typical serial interface settings such as baud rates, flow control, a number of stop bits, and the like do not need to be configured between the host computer 530 and the other communications device 510. This allows communication between devices and systems that otherwise could not communicate because of serial interface incompatibility.

The communications device 510 includes an embedded remote access application 575 to provide remote access by the host computer 530 to the application-specific display 505 by communicating display data via the network 545. The remote access application 575 and the COM port server 555 are communicatively coupled to the network 545 by the Ethernet interface 549.

Figure 6:
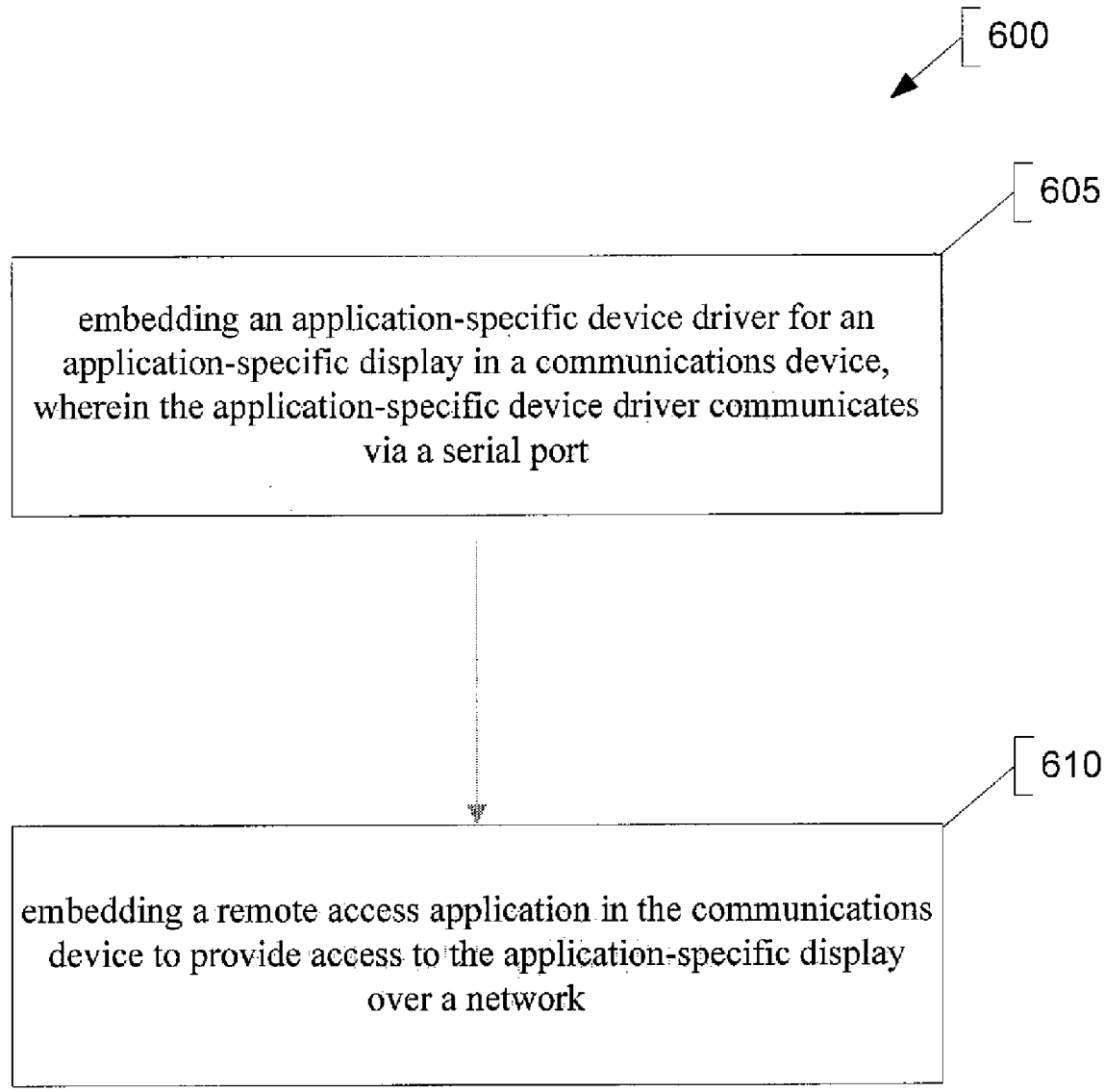
FIG. 6 shows a diagram of an embodiment of a method of providing monitoring of an application-specific display by a computer over a network.

FIG. 6 shows a diagram of an embodiment of a method 600 of providing monitoring of an application-specific display by a computer over a network. At 605, an application-specific device driver for an application-specific display is embedded in a communications device. The application-specific display device driver communicates via a serial port. In some embodiments, application-specific display device driver emulates an ASCII terminal driver and displays data on a VGA, SVGA, or LCD display.

At 610, a remote access application is embedded in the communications device to provide access to the application-specific display over the network. In some embodiments the network implements an internet protocol and the embedded remote access application, and thereby the display, is accessed on the network using an internet protocol (IP) address. Display data is relayed over the network to a computer where a service person is able to monitor the application-specific display remotely. In some embodiments, the remote access application includes a virtual network computing (VNC) server application to communicate over the network with a VNC client. In some embodiments, the remote access application includes a remote desktop protocol (RDP) server application to communicate over the network with an RDP client.

According to some embodiments, the method 600 includes establishing communication (COM) port redirection software. To establish the redirection software, a COM port server is initiated on the communications device and a COM port client on a host computer is communicatively coupled to the communications device via the network. At least one COM port connection to the COM port server is emulated in the communications device. In some embodiments, emulating a COM port connection includes storing data received from the host computer in a memory buffer. At least one serial port driver is also emulated on the communications device. In some embodiments, emulating a serial port driver includes taking data from the memory buffer and translating the data into a predefined format. In this way, the embedded application-specific device driver is able to communicate with the COM port client via the emulated serial port driver as if it was a physical serial port.

The communications device may include one or more actual physical serial ports in addition to the emulated virtual serial port. According to some embodiments, the method 600 includes using the embedded remote access application to remotely access a device coupled to the physical serial port over the network. Data communicated on the physical serial port is monitored remotely by communicating the data to a computer over the network. The communications device may include one or more universal serial bus (USB) ports. In some embodiments, the method 600 includes using the embedded remote access application to remotely access a device coupled to a USB port. Data communicated on the USB port is communicated to a monitoring computer over the network.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. A communications device comprising:
    a processor;
    an embedded application-specific device driver for an application-specific display, wherein the embedded application-specific device driver executes on the processor and is configured to communicate data with a communication (COM) port via a serial port and to provide a video signal to the application-specific display;
    a COM port server that, together with a COM port client located on a separate device, establishes COM port redirection over a network and communicates with a serial port;
    a virtual serial port application connected between and co-located with the embedded application-specific device driver and the COM port server, wherein the virtual serial port application translates data communicated between the COM port server and the embedded application-specific device driver; and
    an embedded remote access application that executes on the processor and is configured to provide remote access to the application-specific display to a client on a separate device by communicating display data via the network.

2. The communications device of claim 1, wherein the virtual serial port application includes:
    a serial port driver in communication with the embedded application-specific device driver; and
    a memory buffer in communication with the serial port driver to function as a virtual serial port by storing data received from the serial port driver and the COM port server.

3. The communications device of claim 1, further including a plurality of peripheral device ports, including at least one serial port and at least one universal serial bus (USB) port, and wherein the embedded remote access application is adapted to remotely access devices coupled to the serial port and USB port.

4. The communications device of claim 1, wherein the embedded application-specific device driver includes an embedded ASCII display terminal driver.

5. The communications device of claim 1, wherein the application-specific display includes a kitchen display terminal.

6. The communications device of claim 1, wherein the application-specific display includes a point of sale (POS) display terminal.

7. The communications device of claim 1, wherein the application-specific display includes a public information display terminal.

8. The communications device of claim 1, wherein the application-specific display includes a digital advertising display terminal.

9. A communications system comprising:
    a communications device including:
    a processor;
    an embedded application-specific device driver for an application-specific display, wherein the embedded application-specific device driver executes on the processor and is configured to communicate data with a communication (COM) port via a serial port and to provide a video signal to the application-specific display;
    an embedded remote access application that executes on the processor and is configured to provide remote access to the application-specific display and to communicate display data via a network; and
    a COM port server that, together with a COM port client, establishes COM port redirection over the network and communicates with a serial port;
    a virtual serial port application connected between and co-located with the embedded application-specific device driver and the COM port server, wherein the virtual serial port application translates data communicated between the COM port server and the embedded application-specific device driver; and
    a host computer, configured to communicate with the embedded remote access application over the network and to remotely access the application-specific display via the embedded remote access application, wherein the host computer includes a COM port client to establish COM port redirection over the network with the COM port server.

10. The system of claim 9, wherein the network uses an internet protocol standard and wherein the communications device is adapted to provide access to the embedded remote access application according to an internet protocol (IP) address to allow monitoring of the application-specific display.

11. The system of claim 9, wherein the embedded remote access application includes an embedded virtual network computing (VNC) server application to communicate over the network to a VNC client on the host computer.

12. The system of claim 9, wherein the embedded remote access application includes an embedded remote desktop protocol (RDP) server application to communicate over the network to an RDP client on the host computer.

13. A system comprising:
a communications device including:
a processor;
an embedded application-specific device driver for an application-specific display, wherein the embedded application-specific device driver executes on the processor and is configured to communicate data with a communication (COM) port via a serial port and to provide a video signal to the application-specific display;
a COM port server that, together with a COM port client, establishes COM port redirection over a network and communicates with a serial port;
a virtual serial port application connected between and co-located with the embedded application-specific device driver and the COM port server, wherein the virtual serial port application translates data communicated between the COM port server and the embedded application-specific device driver; and
an embedded remote access application that executes on the processor and is configured to provide remote access to the application-specific display to a client on a separate device by communicating display data via the network; and
a display to be coupled to the communications device.

14. The system of claim 13, wherein the communications device further includes a host computer, configured to communicate with the embedded remote access application over the network and to remotely access the display,
wherein the network uses an internet protocol standard, and
wherein the communications device is adapted to provide access to the embedded remote access application according to an internet protocol (IP) address to allow monitoring of the display.

15. A method of remotely monitoring a display using a computer system, the method comprising:
embedding an application-specific device driver for an application-specific display in a communications device, wherein the application-specific device driver communicates via a serial port;
establishing communication (COM) port redirection software, wherein establishing includes initiating a COM port server on the communications device and a COM port client on a host computer communicatively coupled to the communications device via a network;
emulating at least one serial port driver on the communications device to translate data communicated between the COM port server and the embedded application-specific driver; and
embedding a remote access application in the same communications device as the application-specific device driver, the COM port server, and the emulated serial port driver to provide access to the application-specific display over the network to a client on a separate device.

16. The method of claim 15, further including:
emulating at least one COM port connection to the COM port server in the communications device, wherein emulating includes storing data received from the host computer in a memory buffer; and
wherein emulating a serial port driver includes taking data from the memory buffer and translating the data into a predefined format such that the embedded application-specific device driver that executes on the communication device communicates with the COM port client using the emulated serial port driver.

17. The method of claim 15, further including:
accessing the embedded remote access application via the network using an internet protocol (IP) address; and
relaying display data from the application-specific display over the network for remote monitoring of the application-specific display.

18. The method of claim 15, wherein embedding an application-specific device driver includes embedding an ASCII terminal driver in the communications device.

19. The method of claim 15, wherein embedding a remote access application includes embedding a virtual network computing (VNC) server application in the communications device to communicate over the network with a VNC client.

20. The method of claim 15, wherein embedding a remote access application includes embedding a remote desktop protocol (RDP) server application in the communications device to communicate over the network with an RDP client.

21. The method of claim 15, further including remotely accessing a device coupled to a physical serial port of the communications device using the embedded remote access application.

22. The method of claim 15, further including remotely accessing a device coupled to a universal serial bus (USB) port of the communications device using the embedded remote access application.

* * * * *